(12) United States Patent
Landsmann

(10) Patent No.: US 9,702,392 B2
(45) Date of Patent: Jul. 11, 2017

(54) SCREW WITH A SCREW HEAD WHICH HAS A DRIVE

(71) Applicant: EJOT GmbH & Co. KG, Bad Berleburg (DE)

(72) Inventor: Nils Landsmann, Langewiese (DE)

(73) Assignee: EJOT GmbH & Co., KG, Bad Berleburg (DE)

( * ) Notice: Subject to any disclaimer, the term of this patent is extended or adjusted under 35 U.S.C. 154(b) by 0 days.

(21) Appl. No.: 14/895,983

(22) PCT Filed: Jun. 5, 2014

(86) PCT No.: PCT/EP2014/061714
§ 371 (c)(1),
(2) Date: Dec. 4, 2015

(87) PCT Pub. No.: WO2014/195411
PCT Pub. Date: Dec. 11, 2014

(65) Prior Publication Data
US 2016/0115988 A1    Apr. 28, 2016

(30) Foreign Application Priority Data
Jun. 5, 2013   (DE) .......................... 10 2013 105 810

(51) Int. Cl.
*F16B 35/06*   (2006.01)
*F16B 23/00*   (2006.01)

(52) U.S. Cl.
CPC ................... *F16B 23/003* (2013.01)

(58) Field of Classification Search
CPC ..................................... F16B 35/06
(Continued)

(56) References Cited

U.S. PATENT DOCUMENTS 2,359,898 A * 10/1944 Clark ................... F16B 23/0092
                                                       411/404
2,400,684 A *  5/1946 Clark .................... B25B 15/005
                                                       411/403
(Continued)

FOREIGN PATENT DOCUMENTS

CN    1069322 A    2/1993
CN    1280652 A    1/2001
(Continued)

OTHER PUBLICATIONS

International Preliminary Report on Patentability and Written Opinion in corresponding PCT application PCT/EP2014/061714 dated Dec. 17, 2015, 7 pp. in German and 6 pp. in English.
(Continued)

*Primary Examiner* — Roberta Delisle
(74) *Attorney, Agent, or Firm* — Juan Carlos A. Marquez; Marquez IP Law Office PLLC

(57) ABSTRACT

A screw with a screw head which has a drive that includes cams that are formed by recesses introduced around the cams. The cams are used to transmit torque, in which, on the cam end facing the screw head, a cam has a cam head surface inclined with respect to a plane that extends perpendicular to the screw axis. The radial extension of the cams is arranged and designed such that the cams center a tool introduced into the screw drive. The cam head surface has a first surface and a second surface, each of which is inclined in its respective rotational direction and which intersect each other in an intersection line.

6 Claims, 4 Drawing Sheets

Figure 1:
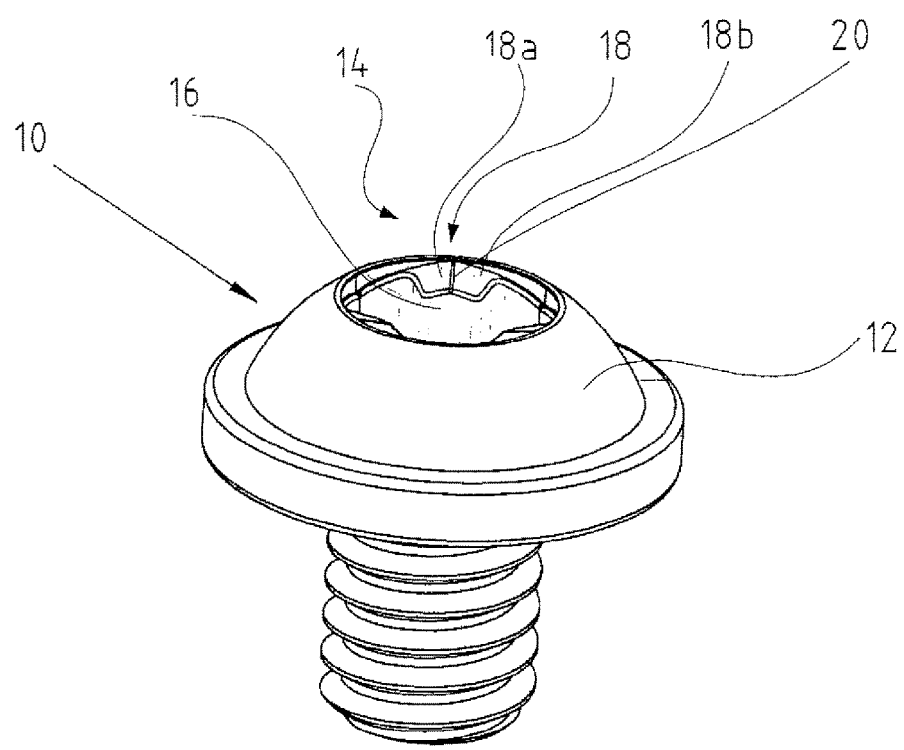

(58) Field of Classification Search
USPC .......................................... 411/402, 403, 404
See application file for complete search history.

(56) References Cited

U.S. PATENT DOCUMENTS

| | | | |
|---|---|---|---|
| 2,592,462 A * | 4/1952 | Phipard, Jr. | F16B 23/0023 411/403 |
| 2,777,353 A * | 1/1957 | Willis | F16B 23/0038 411/403 |
| 3,108,623 A * | 10/1963 | Muenchinger | B25B 15/005 411/404 |
| 3,449,988 A * | 6/1969 | Gallo, Sr. | B25B 15/00 227/147 |
| 3,481,243 A | 12/1969 | Gatz | |
| 3,604,305 A * | 9/1971 | Dreger | F16B 23/003 411/403 |
| 4,084,478 A * | 4/1978 | Simmons | B21K 1/463 411/404 |
| 4,151,621 A * | 5/1979 | Simmons | B21K 1/463 411/407 |
| 4,202,244 A * | 5/1980 | Gutshall | F16B 23/0023 411/404 |
| 5,120,173 A | 6/1992 | Grady | |
| 5,171,117 A | 12/1992 | Seidl | |
| 5,219,253 A * | 6/1993 | Shinjo | F16B 23/003 411/403 |
| 5,364,212 A * | 11/1994 | Gill | B25B 15/005 411/404 |
| 5,641,258 A * | 6/1997 | Sala | F16B 23/003 411/402 |
| 6,223,634 B1 | 5/2001 | Hughes et al. | |
| 7,073,416 B2 | 7/2006 | Kozak et al. | |
| 7,077,038 B2 | 7/2006 | Toyooka et al. | |
| 8,001,874 B2 * | 8/2011 | Totsu | B21K 1/463 411/404 |
| 2003/0002952 A1 * | 1/2003 | Totsu | B21K 1/46 411/403 |
| 2005/0047891 A1 * | 3/2005 | Toyooka | F16B 23/0023 411/403 |
| 2005/0076751 A1 | 4/2005 | Panasik et al. | |
| 2011/0048181 A1 * | 3/2011 | Tsai | B25B 15/005 81/460 |
| 2011/0182696 A1 | 7/2011 | Ogawa et al. | |

FOREIGN PATENT DOCUMENTS

| | | |
|---|---|---|
| CN | 1573137 A | 2/2005 |
| DE | 35 01 414 A1 | 7/1985 |
| JP | 2011-133090 A | 7/2011 |
| WO | 93/13323 | 7/1993 |

OTHER PUBLICATIONS

International Search Report in corresponding PCT application PCT/EP2014/061714 dated Aug. 14, 2014, 2 pp. in German an 3 pp. in English.

Office Action from Chinese Patent Office in the counterpart Chinese Application No. 20148004343294.4 dated Sep. 28, 2016, in Chinese.

* cited by examiner

SCREW WITH A SCREW HEAD WHICH HAS A DRIVE

The invention relates to a screw with a screw head which has a drive, as specified in the preamble of claim 1.

Document DE 35 01 414 A1 discloses a screw which has a screw head that includes a drive. The cams provided for transmitting torque have a cam head surface which extends perpendicular to the plane of the screw and which is laterally inclined toward the cam side surface.

In the prior art, screws having a screw head provided with a drive are known under the "autosert" brand name. The drive of these screws comprises cams which are formed by recesses made around the cams and are used to transfer torque. It is further known that on the cam end facing the screw head, each such cam exhibits a cam head surface which is inclined in the direction of insertion with respect to a plane that extends perpendicular to the axis of the screw. A design of this type is for example described in document U.S. Pat. No. 5,171,117 A.

Screws of this type are particularly suited for automatic screwdriving tools where a particularly simple coupling of a screwdriver bit to the screw, in particular in the case of continuously rotating tools, is thus achieved due to the inclination of the cam head surface in the direction of insertion.

It is the object of the invention to provide an improved drive of the screw which facilitates the introduction of a tool in the case of a non-rotating tool.

According to the present invention, the radial extension of the cams is thus arranged and designed so as to centre a tool introduced into the screw drive, and furthermore, the head surface is subdivided into first and second surfaces, each of which is inclined in a respective direction of rotation.

The fact that the head surface is subdivided into two surfaces allows the screw to be swiftly placed on a drive tool in a free direction of rotation. Such a design is particularly advantageous for small and miniature screws since their handling, in particular placing them on a drive tool, is already difficult anyhow.

Preferably, the surfaces are disposed such that the two surfaces intersect each other in an intersection line at the centre of the cam.

This ensures that a minimum rotary movement of the screw will suffice to optimally introduce the drive tool into the screw. Also, a screw of this type with a symmetrical design of the head surface has proven to be considerably easier to manufacture.

In another advantageous embodiment of the invention, the intersection line is inclined toward the centre of the screw with respect to the plane that extends perpendicular to the screw axis. Consequently, the recesses of the cams not only facilitate the introduction of entraining elements of a drive tool in a circumferential direction, but also urge them into a proper alignment in a radial direction. Preferably, an inclination of the intersection line of between approx. 10° and 30° may be chosen with respect to the plane which extends perpendicular to the axis of the screw.

According to the invention, both surfaces of the head surface from an angle of between 120° and 160° at their intersection line. Since, starting from the end facing the screw head, the inclination of the head surface reduces the cam side surfaces which effectively transfer torque, an ideal setting is thus obtained for these inclination angles as far as effective introduction and transfer of torque are concerned.

Preferably, the intersection line between the first and second surfaces is rounded. This rounding of the intersection line facilitates control of the drive tool since it prevents the drive tool from getting jammed on the cutting edge.

Additional advantages, features and possible applications of the present invention may be gathered from the description which follows, in which reference is made to the embodiments illustrated in the drawings.

Figure 2:
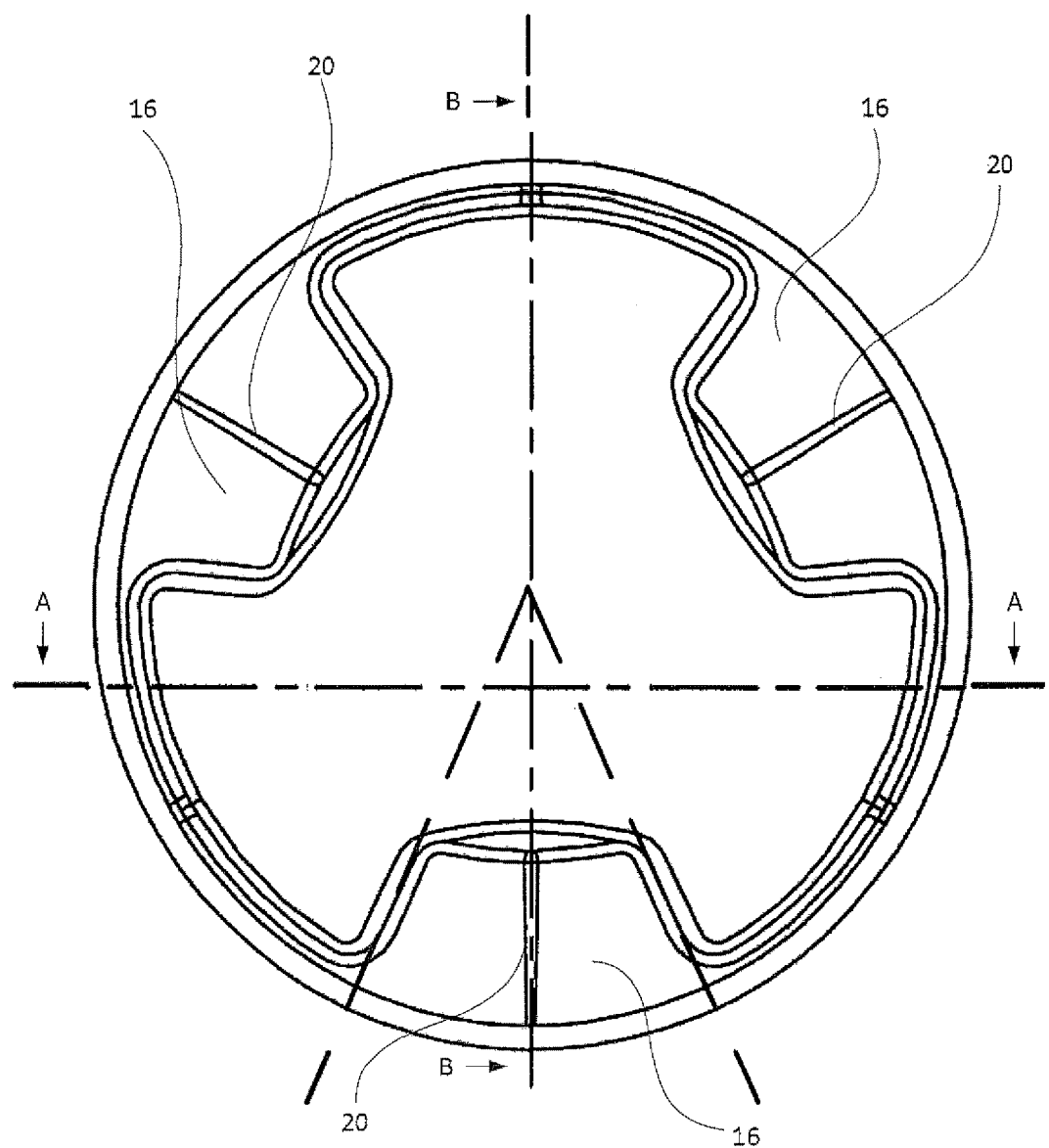
Figure 3:
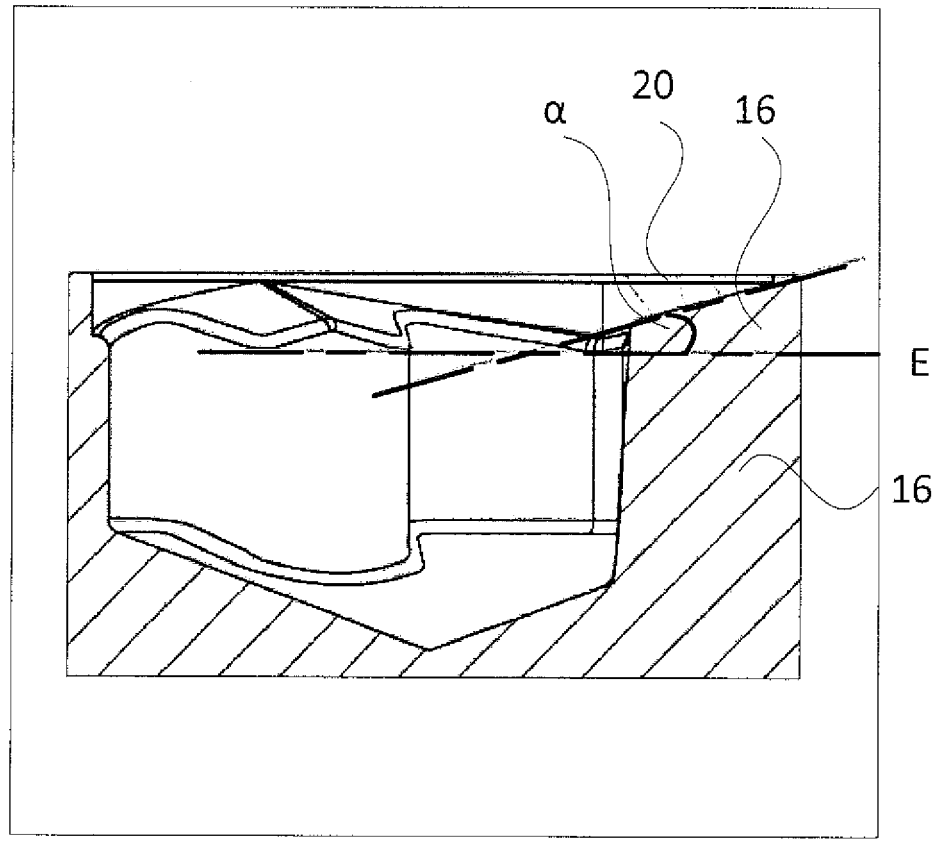
Figure 4:
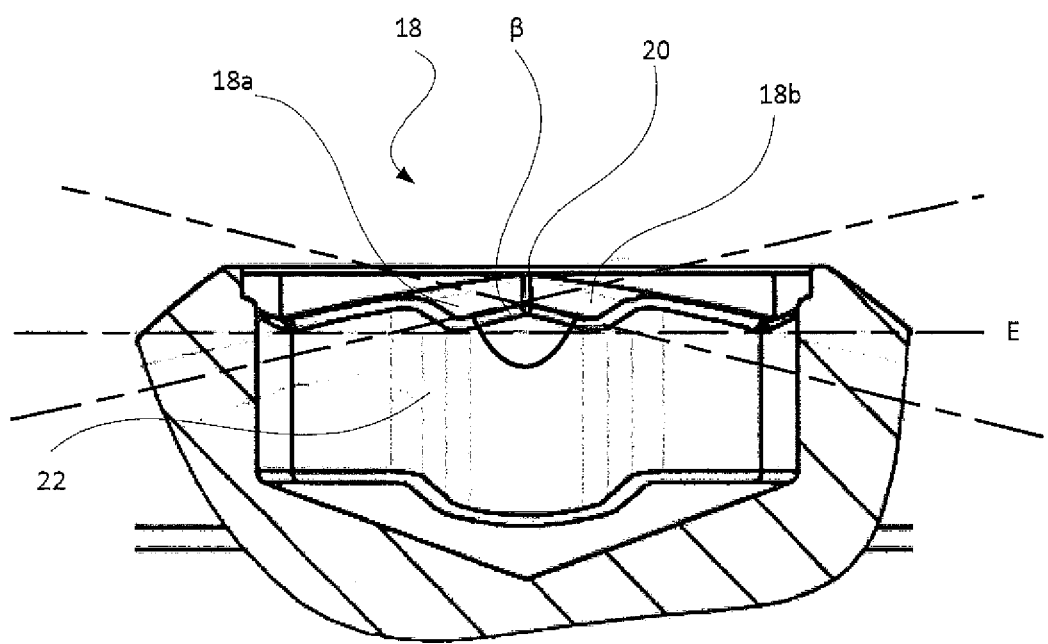

Throughout the description, claims and drawings, the same associated reference signs are used. In the drawings, FIG. 1 is a perspective view of a screw;
FIG. 2 is a top view of the screw head;
FIG. 3 is a view of a section taken along lines B-B, and
FIG. 4 is a view of a section taken along lines A-A.

As seen in FIG. 1, the screw 10 of the invention has a screw head 12 in which a drive 14 has been formed. For the transfer of torque, the drive 14 of the screw comprises cams 16 which are formed by recesses made around the cams 16. According to the invention, each cam 16 has a cam head surface 18 with two surfaces 18a, 18b which are inclined with respect to a plane that is perpendicular to the screw axis. The purpose of the respective inclinations of the cam head surface 18 will be described with reference to the following figures.

FIG. 2 is a top view of a screw according to the invention which has three cams 16. All three cams 16 have a central linear bearing section at the centre of each cam 16, which bearing section extends along the height of the cam and serves to centre a tool in the screw. The intersection lines 20 extend on the respective angle bisecting line of the circle segment which defines the width of the cam 16. Furthermore, this view shows intersection lines 20 whose sections, i.e. section B-B of FIG. 3 and section A-A of FIG. 4, will be explained in more detail below.

The view of FIG. 3 is a section taken along lines B-B which intersects the screw head at the centre of the cam 16. As can be clearly seen in this view, intersection line 20 of surfaces 18a and 18b is inclined in a radial direction at an angle $\alpha$ with respect to a plane E which extends perpendicular to the axis of the screw. This inclination $\alpha$ facilitates the introduction of a tool in a radial direction as it forces the tool to slide into the central centering portion between the cams. As a result, when a tool (not shown) is introduced, such tool will automatically be guided toward the centre of the screw.

The view of FIG. 4 is a section taken along lines A-A of FIG. 2, which clearly shows that the two surfaces which intersect each other at an intersection line 20 are each inclined in a rotational direction with respect to plane E that extends perpendicular to the screw axis. The intersection line 20 of the two inclined surfaces 18a, 18b is at the centre of the cam. This ensures that, depending on the location of entraining elements of a drive tool to be introduced, a minimum rotary movement of the screw 10 will suffice to bring the entraining elements into the proper position, corresponding to the recesses, and into engagement with the cams. In this case, the two surfaces define an angle $\beta$ of approx. 150° between them. This angle has been chosen so as to aid introduction and ensure the necessary sliding of the entraining elements along the cam head surface 18, but to still yield a maximum cam side surface 22 so that the required torque can be transferred easily.

This solution is also ideal for miniature screws whose handling is difficult enough anyhow since it allows them to be placed on a drive tool in a reliable and simple manner.

The invention claimed is:

1. A screw with a screw head which has a drive, which drive comprises a plurality of cams that are formed by recesses introduced around the cams, which cams are used to transmit torque, in which on an upper cam end facing the screw head, each cam has a cam head surface which is inclined with respect to a plane that extends perpendicular to the screw axis and a central linear bearing section that extends along a height of each cam, characterized in that the radial extension of the cams is arranged and designed such that the cams centre a tool introduced into the screw drive, and each cam head surface has a first surface and a second surface which intersect each other along an intersection line and the first and second surfaces are each inclined a respective rotational direction.

2. A screw as claimed in claim 1 characterized in that the intersection line of the two surfaces is at the centre of the cam.

3. A screw as claimed in claim 1 characterized in that the intersection line of the two surfaces is inclined with respect to the plane that extends perpendicular to the screw axis.

4. A screw as claimed in claim 3 characterized in that the intersection line of the two surfaces is inclined at an angle of between 10° and 30° relative to the plane which extends perpendicular to the screw axis.

5. A screw as claimed in claim 1 characterized in that the two surfaces define an obtuse angle between them.

6. A screw as claimed in claim 5 characterized in that the two surfaces define an angle of between 120° and 160° between them.

* * * * *